(12) United States Patent
Yamaguchi

(10) Patent No.: US 7,170,082 B2
(45) Date of Patent: Jan. 30, 2007

(54) METHOD OF AND APPARATUS FOR READING OUT RADIATION IMAGE

(75) Inventor: Akira Yamaguchi, Kanagawa-ken (JP)

(73) Assignee: Fuji Photo Film Co., Ltd., Kanagawa-ken (JP)

( * ) Notice: Subject to any disclaimer, the term of this patent is extended or adjusted under 35 U.S.C. 154(b) by 0 days.

(21) Appl. No.: 10/986,214

(22) Filed: Nov. 12, 2004

(65) Prior Publication Data
US 2005/0098747 A1    May 12, 2005

(30) Foreign Application Priority Data
Nov. 12, 2003  (JP) .............................. 2003/382128

(51) Int. Cl.
G01N 23/04   (2006.01)
(52) U.S. Cl. ................... 250/591; 250/338.4
(58) Field of Classification Search .............. 250/591
See application file for complete search history.

(56) References Cited
U.S. PATENT DOCUMENTS
5,107,275 A * 4/1992 Tsuruoka et al. ............ 347/247
6,310,358 B1 * 10/2001 Zur ............................ 250/591
6,770,901 B1   8/2004 Ogawa et al.

\* cited by examiner

Primary Examiner—Renee Luebke
Assistant Examiner—Mary Zettl
(74) Attorney, Agent, or Firm—Sughrue Mion, PLLC

(57) ABSTRACT

A radiation image is read out by causing a linear reading light beam to scan a radiation image sensor, which has a plurality of parallel linear electrodes to output charge signals according to the radiation image upon exposure to a reading light beam in the longitudinal direction of the linear electrodes, and obtaining an image signal by integrating charge signals, output by the respective linear electrodes in response to the scan of the reading light beam. A pulsed light beam which is projected onto the radiation image sensor for a predetermined time in each of the integrating times is employed as the reading light beam, and projection of the pulsed light beam is controlled so that the center of the time for which the pulsed light beam is projected onto the radiation image sensor is earlier than the center of the integrating time.

5 Claims, 7 Drawing Sheets

METHOD OF AND APPARATUS FOR READING OUT RADIATION IMAGE

BACKGROUND OF THE INVENTION

1. Field of the Invention

This invention relates to a method of and apparatus for reading a radiation image where an image signal is obtained by integrating by integrating amplifier charge signals output from a radiation image sensor which stores a radiation image upon exposure to radiation bearing thereon the radiation image and outputs charge signals according to the stored radiation image upon exposure to reading light.

2. Description of the Related Art

Various radiation image sensors on which a radiation image of an object is recorded upon exposure to radiation passing through the object and which outputs charge signals representing the recorded radiation image have been proposed and put into practice.

As the radiation image sensor, there has been known those employing semiconductor material which generates electric charges upon exposure to radiation. As such radiation image sensors, there have been proposed those of so-called an optical-reading system.

As the radiation image sensor of the optical-reading system, a radiation image sensor comprising a first electrode layer permeable to radiation, a recording photoconductive layer which generates electric charges upon exposure to radiation, a charge transfer layer which behaves like a substantially insulating material to the electric charge in the same polarity as a latent image and behaves like a substantially conductive material to the electric charge in the polarity opposite to that of the latent image, a reading photoconductive layer which generates electric charges upon exposure to reading light, and a second electrode layer in which a plurality of linear electrodes permeable to the reading light are arranged in parallel to each other, the layers being superposed one on another in this order, is proposed in U.S. Pat. No. 6,770,901.

In the radiation image sensor, radiation is projected onto the radiation image sensor from the first electrode layer side and electric charges generated in the recording photoconductive layer are stored on the interface between the recording photoconductive layer and the charge transfer layer, thereby recording a radiation image. When a linear reading light beam scans the radiation image sensor in the longitudinal direction of the linear electrodes, electric charges are generated in the reading photoconductive layer and the electric charges are combined with the stored electric charges and flow into the linear electrodes. The charge signals flowing into the linear electrodes are integrated by integrating amplifiers (so-called charge amplifiers) connected to the linear electrodes, whereby an image signal is obtained and the radiation image is read out.

FIG. 9 shows a timing chart representing the relation between the reading light beam projecting time and the integrating time of the integrating amplifiers when the radiation image is read out as well as the amplitude of the signal current output from the linear electrodes of the radiation image sensor and the amplitude of the output voltage of the integrating amplifiers upon exposure to the reading light beam. It is assumed that a radiation image has been recorded on the radiation image sensor in the distribution shown in FIG. 9, that is, linear images extending in the same direction as the reading light source are recorded in parallel at predetermined intervals in the scanning direction of the reading light source, i.e., in the direction of arrow X in FIG. 9.

As shown in FIG. 9, conventionally the recording light beam is projected onto the radiation image sensor by continuously moving the reading light source in the longitudinal direction of the linear electrodes, and the image signal components (making up the image signal) are obtained for each integrating time by turning on and off the reset switches for the integrating amplifiers in response to the movement of the reading light source.

However, projection of the reading light beam is disadvantageous in that since the radiation image sensor is slow in response speed to the reading light, for example, the signal current output from the radiation image sensor in response to projection of the reading light beam for integrating time S1 can be continuously output from the radiation image sensor even in the next integrating time S2 as shown in FIG. 9 and accordingly, an output voltage is output from the integrating amplifier as an image signal component also in the integrating time S2 when the signal current is to be 0 (the hatched portion in FIG. 9), which forms noise and deteriorates the image quality such as the sharpness of the read radiation image.

Further, it has been proposed to use as the reading light source a pulsed light source in place of the light source which continuously emits the reading light, that is, to intermittently project the recording light beam for integrating times. However, even in this system, it is preferred that the reading light projecting time be as long as possible and a method of ensuring a sufficient reading light projecting time and at the same time avoiding generation of the noise due to delay in response of the radiation image sensor to the reading light has not been found.

There has been known so-called correlation double sampling as a method of obtaining an image signal by the use of an integrating amplifier. In the correlation double sampling, an image signal is obtained on the basis of the difference between the output of the integrating amplifier just after the initiation of the integration and just before the termination of the integration. Accordingly, if the reading light is projected onto the radiation image sensor upon sampling of the output of the integrating amplifier just after the initiation of the integration, the signal current output from the radiation image sensor in response to projection of the reading light creates an offset voltage and deteriorates the S/N of the read radiation image.

SUMMARY OF THE INVENTION

In view of the foregoing observations and description, the primary object of the present invention is to provide a method of and apparatus for reading out a radiation image which can prevent deterioration of the image quality such as sharpness of the read-out image by ensuring a sufficient reading light projecting time and at the same time avoiding generation of the noise due to delay in response of the radiation image sensor to the reading light in a method of and apparatus for reading a radiation image where an image signal is obtained by integrating by integrating amplifier charge signals output from a radiation image sensor which stores a radiation image upon exposure to radiation bearing thereon the radiation image.

Another object of the present invention is to provide a method of and apparatus for reading out a radiation image which can prevent generation of the offset voltage as described above and deterioration of the S/N of the read radiation image when the image signal is obtained through the above correlation double sampling.

In accordance with an aspect of the present invention, there is provided a method of reading out a radiation image comprising the steps of causing a linear reading light beam to scan a radiation image sensor, on which a radiation image is recorded upon exposure to radiation bearing thereon the radiation image and which has a plurality of parallel linear electrodes to output charge signals according to the radiation image when longitudinally scanned by a linear reading light beam extending in a direction perpendicular to the longitudinal direction of the linear electrodes, in the longitudinal direction of its linear electrodes, and obtaining an image signal by integrating charge signals, output by the respective linear electrodes in response to the scan of the reading light beam, for each integrating time, wherein the improvement comprises that a pulsed light beam which is projected onto the radiation image sensor for a predetermined time in each of the integrating times is employed as the reading light beam, and projection of the pulsed light beam is controlled so that the center of the time for which the pulsed light beam is projected onto the radiation image sensor is earlier than the center of the integrating time.

In accordance with another aspect of the present invention, there is provided an apparatus for reading out a radiation image comprising a reading light source portion which causes a linear reading light beam to scan a radiation image sensor, on which a radiation image is recorded upon exposure to radiation bearing thereon the radiation image and which has a plurality of parallel linear electrodes to output charge signals according to the radiation image when longitudinally scanned by a linear reading light beam extending in a direction perpendicular to the longitudinal direction of the linear electrodes, in the longitudinal direction of its linear electrodes, and an image signal detecting portion having a plurality of integrating amplifiers which obtain an image signal by integrating charge signals, output by the respective linear electrodes in response to the scan of the reading light beam, for each integrating time and outputs the integrated image signal, wherein the improvement comprises that the reading light source comprises a pulsed light source which emits a pulsed light beam projected onto the radiation image sensor for a predetermined time in each of the integrating times as the reading light beam, and a light emission control means which controls projection of the pulsed light beam by the pulsed light source so that the center of the time for which the pulsed light beam is projected onto the radiation image sensor is earlier than the center of the integrating time.

The light emission control means may control the emission initiating time of the pulsed light beam by the pulsed light source so that there is a non-lighting time, for which the reading light beam is not lit, before the pulsed light beam is projected onto the radiation image sensor in the integrating time.

In the method and the apparatus of this embodiment, since a pulsed light beam is employed as the reading light beam and projection of the pulsed light beam is controlled so that the center of the time in which the pulsed light beam is projected onto the radiation image sensor is earlier than the center of the integrating time, the signal current generated in the radiation image sensor in response to the pulsed light projected onto the radiation image sensor in each integrating time can be terminated within the integrating time without being continued to the next integrating time, whereby generation of the noise due to delay in response of the radiation image sensor to the reading light can be avoided and deterioration of the image quality such as sharpness of the read-out image can be prevented.

Further, when the emission initiating time of the pulsed light beam by the pulsed light source is controlled so that there is a non-lighting time, for which the reading light beam is not lit, before the pulsed light beam is projected onto the radiation image sensor in the integrating time, generation of the offset voltage due to projection of the reading light just after the initiation of the integration can be prevented and deterioration of the S/N of the read radiation image can be prevented, e.g., when the image signal is obtained through the correlation double sampling.

DESCRIPTION OF THE PREFERRED EMBODIMENTS

Figure 1:
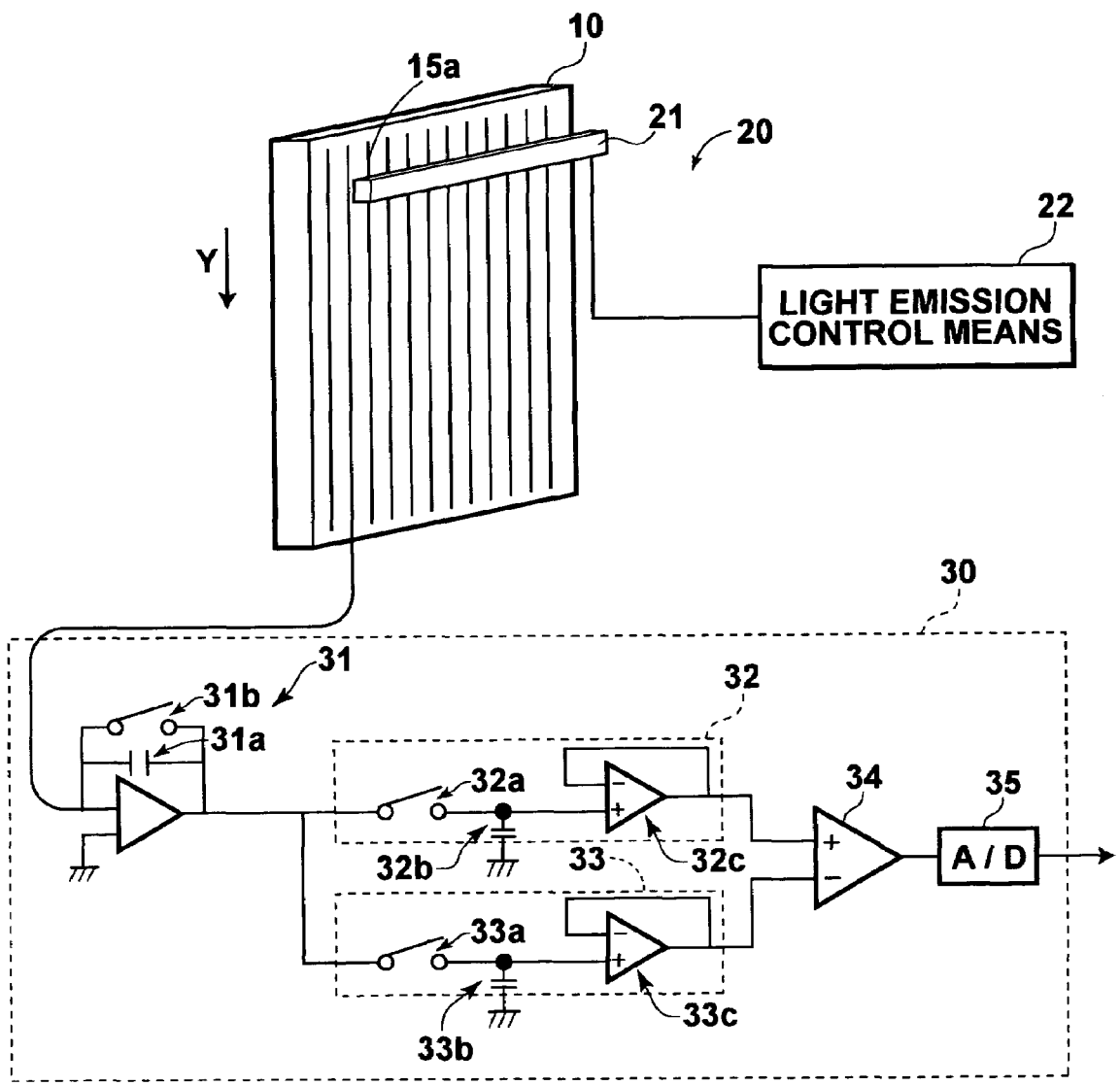
FIG. 1 is a schematic view showing a radiation image recording/read-out apparatus employing a radiation image read-out apparatus in accordance with an embodiment of the present invention.

In FIG. 1, a radiation image recording/read-out apparatus in accordance with an embodiment of the present invention comprises a radiation source (not shown), a radiation image sensor 10 on which a radiation image is recorded upon exposure to radiation passing through an object and which outputs charge signals according to the radiation image recorded thereon, a reading light source portion 20 which causes a linear reading light beam to scan the radiation image sensor 10, and an image signal detecting portion 30 which integrates at each integrating time the charge signal output from the radiation image sensor 10 in response to scan of the reading light beam with integrating amplifiers 31 to be described later and outputs the integrated image signal.

Figure 2:
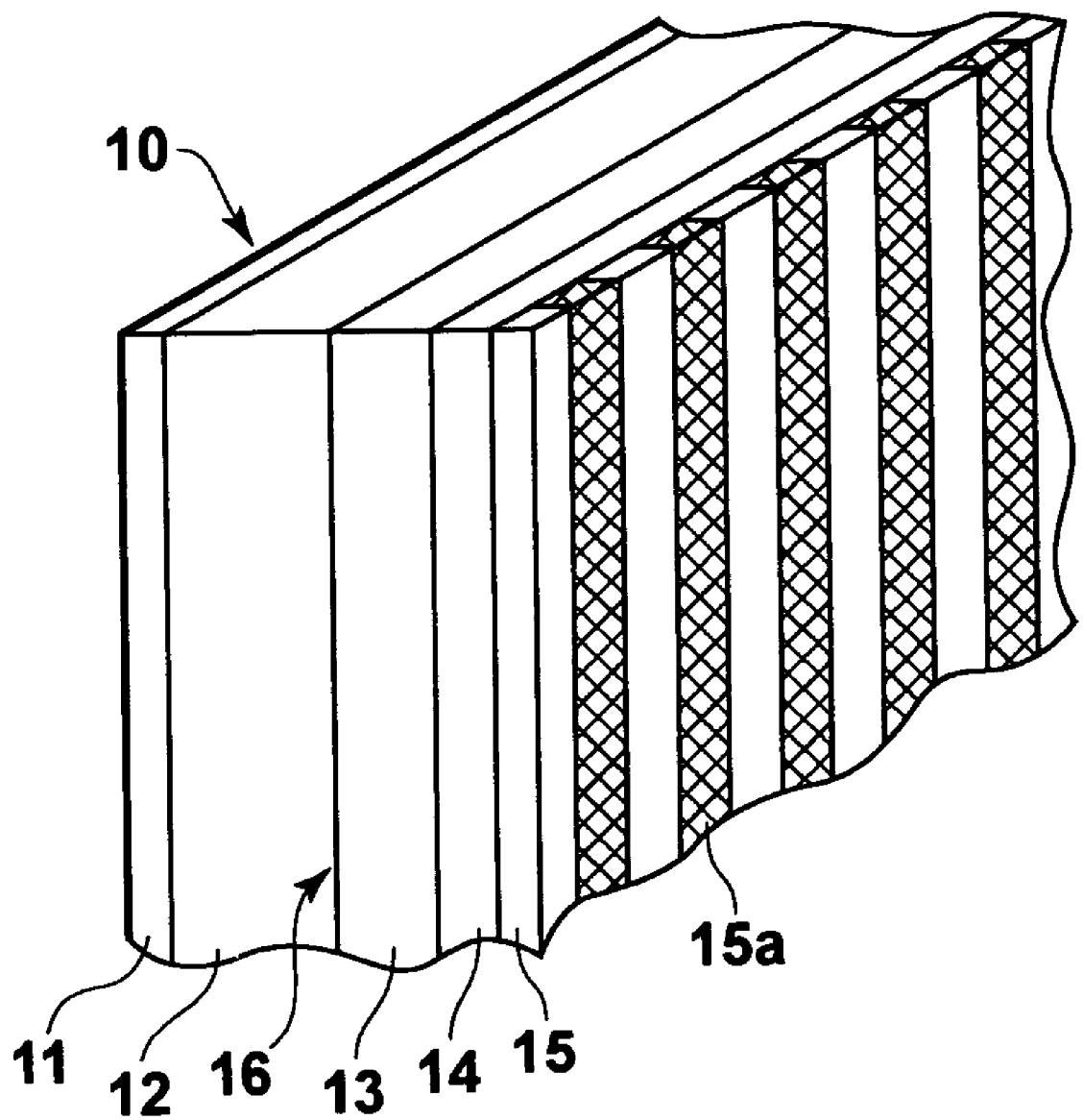
FIG. 2 is a schematic view showing the radiation image sensor employed in the radiation image recording/read-out apparatus.

As shown in FIG. 2, the radiation image sensor 10 comprises a first electrode layer 11 permeable to radiation passing through an object, a recording photoconductive layer 12 which generates electric charges upon exposure to radiation passing through the first electrode layer 11, a charge transfer layer 13 which behaves like a substantially insulating material to the electric charges generated in the recording photoconductive layer 12 and behaves like a substantially conductive material to the electric charge in the polarity opposite to that of the electric charges generated in the recording photoconductive layer 12, a reading photoconductive layer 14 which generates electric charges upon exposure to reading light, and a second electrode layer 15 in which a plurality of linear electrodes 15a permeable to the reading light are arranged in parallel to each other, the layers being superposed one on another in this order. A charge accumulating portion 16 which accumulates electric charges generated according to the amount of the projected radiation is formed at the interface between the recording photoconductive layer 12 and the charge transfer layer 13.

The reading light source portion 20 comprises a pulsed light source 21 which emits, as the reading light, a pulsed light beam which is projected onto the radiation image sensor 10 for a predetermined time in each integrating time (by the integrating amplifier 31) and a light emission control means 22 which controls the light source 21. The radiation image sensor 10 and the reading light source portion 20 are disposed so that the longitudinal direction of the reading light source of the reading light source portion 20 is substantially in perpendicular to the longitudinal direction of the linear electrodes 15a of the radiation image sensor 10. Though the reading light source portion 20 causes the pulsed reading light beam to scan the radiation image sensor 10 by moving the pulsed light source 21 in the longitudinal direction of the linear electrodes 15a, the mechanisms such as for moving the pulsed light source 21 are not shown.

The light emission control means 22 controls projection of the pulsed reading light beam so that the center of the time in which the pulsed light beam is projected onto the radiation image sensor 10 is earlier than the center of the integrating time of the integrating amplifier 31, as will be described in detail later.

The image signal detecting portion 30 comprises an integrating amplifier 31 which integrates charge signals output from the radiation image sensor 10, first and second sample hold circuits 32 and 33 which hold the output voltages output from the integrating amplifier 31, a differential amplifier 34 which outputs the difference between the output voltages respectively held by the first and second sample hold circuits 32 and 33 as an image signal component, and an A/D converter 35 which digitizes the analog image signal component into a digital image signal component. It is preferred that a low-pass filter be interposed between the integrating amplifier 31 and the first and second sample hold circuits 32 and 33 in order to reduce noise.

The integrating amplifier 31 is provided with a capacitor 31a which accumulates the charge signals output from the radiation image sensor 10 and a reset switch 31b for causing the capacitor 31a to discharge the charge signals accumulated therein.

The first and second sample hold circuits 32 and 33 respectively comprises switches 32a and 33a, capacitors 32b and 33b which hold the output voltages output from the integrating amplifier 31, and buffer amplifiers 32c and 33c which output the output voltages held by the capacitors 32b and 33b.

The operating timings of the reset switch 31b of the integrating amplifier 31, the switches 32a and 33a of the first and second sample hold circuits 32 and 33, and the A/D converter 35 are controlled by a control circuit which is not shown.

In FIG. 1 and the description above, only the image signal detecting portion 30 connected to one of the linear electrodes 15a of the radiation image sensor 10 is shown.

The A/D converter 35 may be provided for each linear electrode 15a or the analog image signal components output from the respective differential amplifiers 34 may be sequentially input into one A/D converter 35 through a multiplexer.

Operation of this radiation image recording/read-out apparatus will be described, hereinbelow.

Figure 3A:
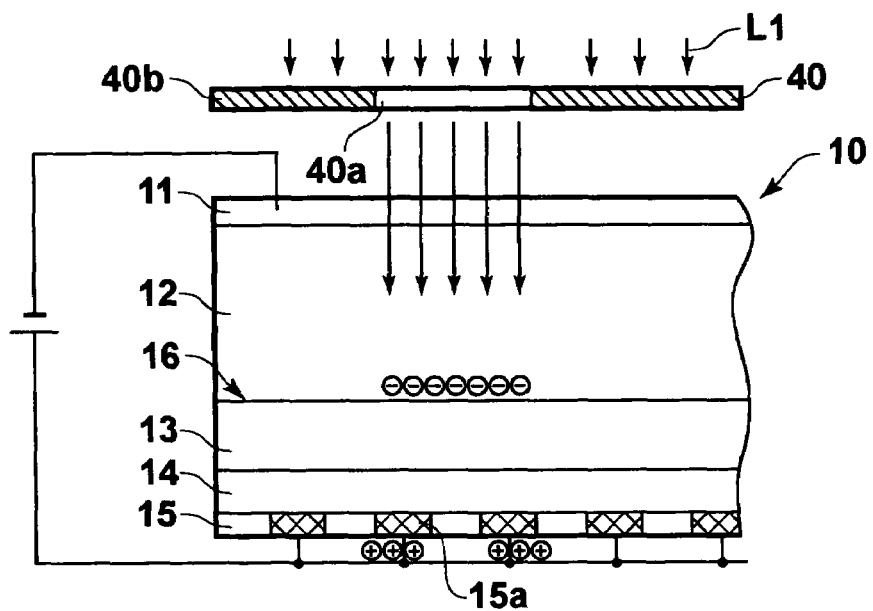
FIGS. 3A and 3B are views for illustrating the operation of the radiation image sensor in the radiation image recording/read-out apparatus.

With the radiation image sensor 10 imparted with an electric voltage so that the first electrode layer 11 is negatively charged and the second electrode layer 15 is positively charged, radiation L1 (FIG. 3A) is projected onto the object 40 from the radiation source. The radiation L1 radiated from the radiation source is projected on the entire area of the object 40 and the radiation passing through the radiation transmitting portion 40a of the object 40 impinges upon the radiation image sensor 10 from the first electrode side while the radiation impinging upon the radiation shielding potion 40b of the object 40 does not reach the radiation image sensor 10 as shown in FIG. 3A.

The radiation L1 impinging upon the radiation image sensor 10 passes through the first electrode layer 11 and impinges upon the recording photoconductive layer 12, whereby charged pairs are generated in the recording photoconductive layer 12. The positive charges of the charged pairs are combined with the negative charges on the first electrode layer 11 and cancelled, whereas the negative charges of the charged pairs are stored on the charge accumulating portion 16 formed on the interface between the recording photoconductive layer 12 and the charge transfer layer 12 as latent image charges, whereby a radiation image is recorded on the radiation image sensor 10.

Then with the first electrode layer 11 grounded, reading light L2 is projected onto the radiation image sensor 10 from the second electrode side.

Figure 4:
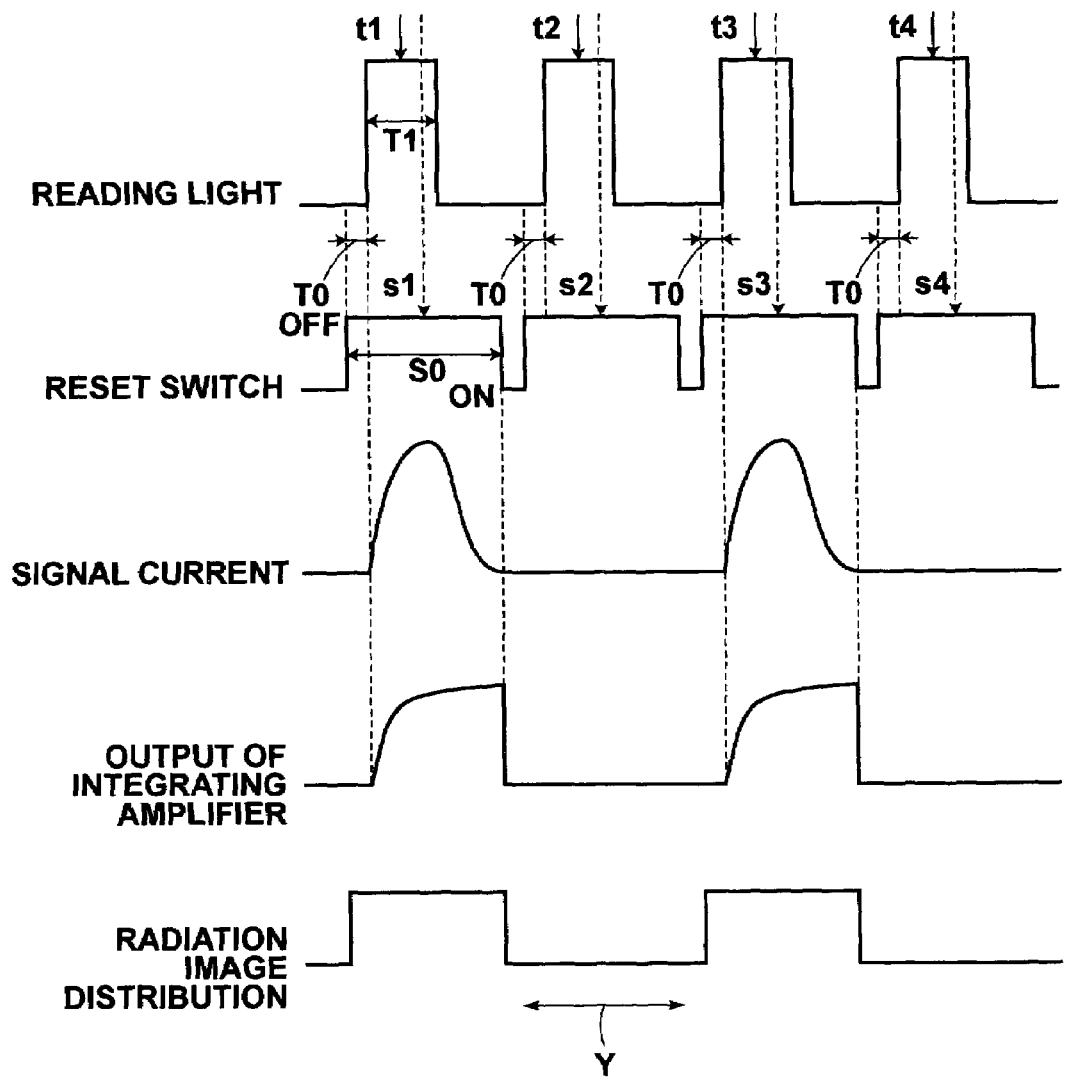
FIG. 4 is a view showing a timing chart representing the relation between the reading light beam projecting time and the integrating time of the integrating amplifiers as the amplitude of the signal current output from the linear electrodes of the radiation image sensor and the amplitude of the output voltage of the integrating amplifiers upon exposure to the reading light beam, in the radiation image recording/read-out apparatus.

FIG. 4 shows a timing chart representing the relation between the timing at which the reading light L2 is projected onto the radiation image sensor 10 and the timing at which the reset switch 31b of the integrating amplifier 31 is turned on and off as well as the amplitude of the signal current output from the linear electrode 15a and the amplitude of the output voltage of the integrating amplifier 31 upon exposure to the reading light beam L2. It is assumed that a radiation image has been recorded on the radiation image sensor in the distribution shown in FIG. 4, that is, linear images extending in the same direction as the pulsed light source 21 are recorded in parallel at predetermined intervals in the scanning direction of the pulsed light source 21, i.e., in the direction of arrow Y in FIG. 4.

As can be seen from FIG. 4, the reset switch 31b of the integrating amplifier 31 is opened (turned off) before the reading light L2 is projected, and the integrating amplifier 31 is turned into an integration initiating state. Then when a non-lighting time T0 has lapsed after the integrating amplifier 31 initiates the integration, the pulsed light source 21 is operated to emit the reading light beam L2 under the control of a control signal from the light emission control means 22.

Figure 3B:
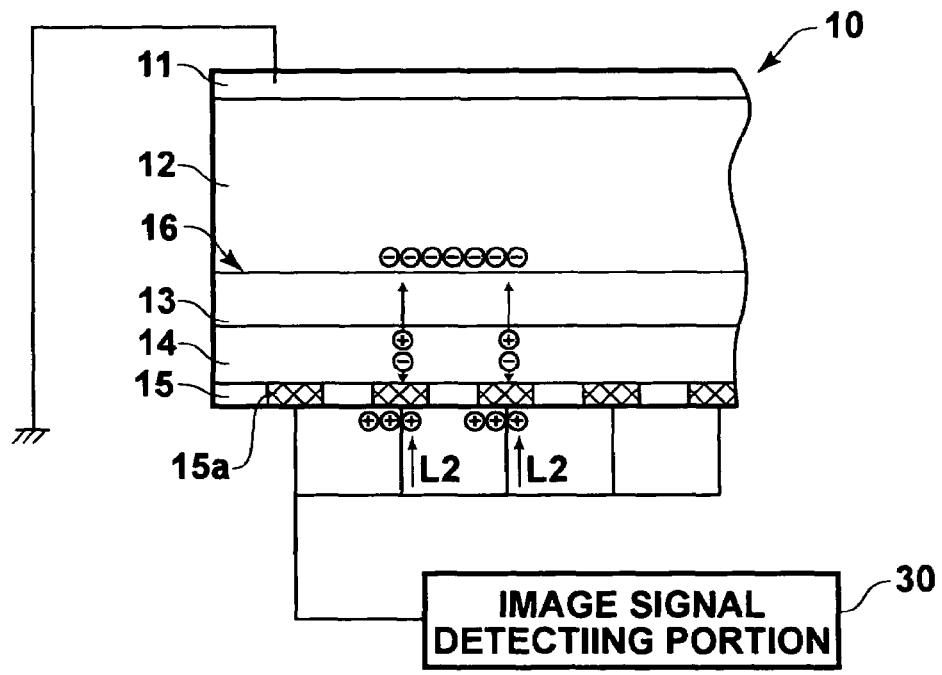

The reading light beam L2 is emitted for a light emitting time T1 in each of the integrating times S0 of the integrating amplifier 31 from the pulsed light source 21 and projected onto the radiation image sensor 10 as shown in FIG. 4. The reading light beam L2 thus projected onto the radiation image sensor 10 impinges upon the reading photoconductive layer 14 through the linear electrodes 15a as shown in FIG. 3B. The positive charges generated in the reading photoconductive layer 14 upon exposure to the reading light beam L2 are combined with the latent image charges on the charge accumulating portion 16, while the negative charges are combined with the positive charges on the linear electrode 15a of the second electrode layer 15 and the charge signal according to the amount of the combined charges is stored in the capacitor 31a of the integrating amplifier 31. When the integrating time S0 has lapsed, the charges stored in the capacitor 31a are discharged and the capacitor 31a is reset. At this time, the pulsed light source 21 is controlled by the light emission control means 22 so that the projection of the reading light beam L2 is stopped before the integrating amplifier 31 is reset. Specifically, as shown in FIG. 4, the light emission control means 22 controls the emission initiating time and the light emitting time T1 of the pulsed light source 21 so that the center t1 to t4 of each of the light emitting times (for which the pulsed light beam is projected onto the radiation image sensor) T1 is earlier than the center s1 to s4 of each of the integrating times S0. That is, the time between the end of emission of the reading light beam L2 and the end of the integration is longer than the non-lighting time T0 between the initiation of the integration and the initiation of emission of the reading light beam L2.

Since the projection of the reading light beam is controlled as described above, the output of the signal current from the radiation image sensor 10 can be confined in the integrating time, and the output of the integrating amplifier 31 corresponding to the part where no radiation image is recorded can be nullified.

In this particular embodiment, the image signal is obtained by correlation-double-sampling the output of the integrating amplifier 31. Specifically, the switches 32a and 33a of the first and second sample hold circuits 32 and 33 are short-circuited before the reset switch 31b of the integrating amplifier 31 is opened. (sample mode) Then immediately after the reset switch 31b of the integrating amplifier 31 is opened (off), the switch 32a of the first sample hold circuit 32 is opened, whereby the output voltage of the integrating amplifier 31 at that time is held by the capacitor 32b of the first sample hold circuit 32. (hold mode) Then, subsequently, immediately before the integrating time S0 lapses, the switch 33a of the second sample hold circuit 33 is opened, whereby the output voltage of the integrating amplifier 31 at that time is held by the capacitor 33b of the second sample hold circuit 33. (hold mode) Thereafter, the reset switch 31b of the integrating amplifier 31 is short-circuited and the electric charges stored in the capacitor 31a is discharged.

The output voltages thus held by the first and second sample hold circuits 32 and 33 are output to the differential amplifier 34 through the buffer amplifiers 32c and 33c. The differential amplifier 34 calculates the difference between the two output voltages and outputs the difference to the A/D converter 35. The A/D converter 35 digitizes the differential signal input as an analog signal and outputs as a digital signal.

After a digital signal is output from the A/D converter 35, the switches 32a and 33a of the first and second sample hold circuits 32 and 33 are short-circuited, and the charges stored in the capacitors 32b and 33b are discharged. Then the reset switch 31b of the integrating amplifier 31 is opened again and integration is started again.

In synchronization with the movement of the pulsed light source 21 in the direction of the arrow Y in FIG. 1, the projection of the pulsed light and the integration by the integrating amplifier 31 described above are effected and finally a digital image signal corresponding to the entire area of the radiation image sensor 10 is detected.

In the radiation image recording/read-out apparatus in accordance with this embodiment, since a pulsed light beam is employed as the reading light beam and projection of the pulsed light beam is controlled so that the center of the time in which the pulsed light beam is projected onto the radiation image sensor is earlier than the center of the integrating time, the signal current generated in the radiation image sensor 10 in response to the pulsed light projected onto the radiation image sensor in each integrating time can be terminated within the integrating time without being continued to the next integrating time, whereby generation of the noise due to delay in response of the radiation image sensor 10 to the reading light can be avoided and deterioration of the image quality such as sharpness of the read-out image can be prevented.

Further, since in the radiation image recording/read-out apparatus in accordance with this embodiment, the emission initiating time of the pulsed light beam by the pulsed light source is controlled so that there is a non-lighting time T0, for which the reading light beam is not lit, before the pulsed light beam is projected onto the radiation image sensor in the integrating time, generation of the offset voltage due to projection of the reading light just after the initiation of the integration can be prevented and deterioration of the S/N of the read radiation image can be prevented, e.g., when the image signal is obtained through the correlation double sampling.

Further, though, in the image signal detecting portion 30 of the embodiment described above, the first and second sample hold circuits 32 and 33 are provided and so-called correlation-double-sampling is effected, the processing of the image signal detecting portion 30 need not be limited to the correlation-double-sampling. For example, only one sample hold circuit is provided and the output voltage of the integrating amplifier held by the sample hold circuit 33 immediately before the integrating time lapses may be obtained as the image signal components. In this case, the control of the reading light emission may be effected in the same manner as described above.

Though, in the embodiment described above, a radiation image recording/read-out apparatus is formed by the radiation source, the radiation image sensor 10, the reading light source portion 20 and the image signal detecting portion 30, a radiation image read-out apparatus may be formed by the radiation image sensor 10, the reading light source portion 20 and the image signal detecting portion 30 without the radiation source or a radiation image read-out apparatus may be formed by the reading light source portion 20 and the image signal detecting portion 30 without the radiation source and the radiation image sensor 10.

Figure 5:
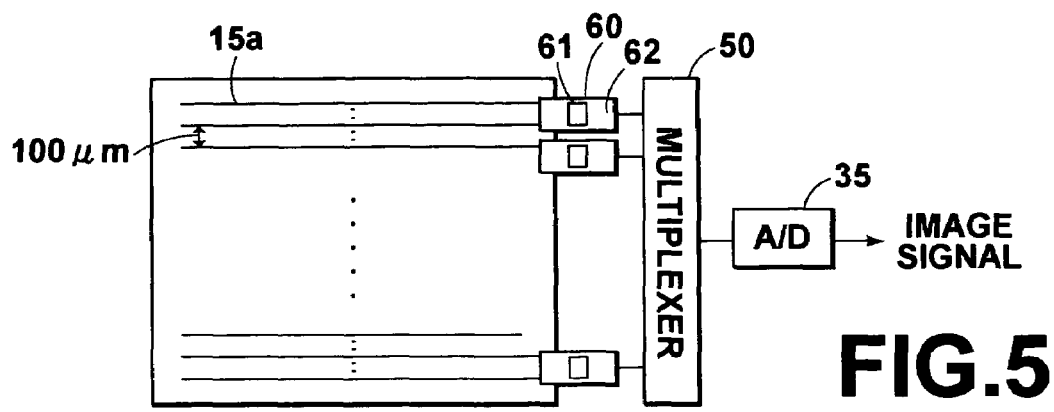
FIG. 5 is a view showing a radiation image recording/read-out apparatus in accordance with another embodiment of the present invention.

Further, when the outputs of the integrating amplifiers 31 connected to the respective linear electrodes 15a are switched by the multiplexer and input into the A/D converter 36 in the embodiment described above, so-called a TAB (Tape Automated Bonding) IC 60, where an integrated amplifier IC 61 comprising integrated integrating amplifiers 31 are loaded on a flexible substrate 62 such as film, may be employed so that a plurality of linear electrodes 15a of the radiation image sensor 10 are connected to the TAB IC 60 and the outputs of the TAB ICs 60 are connected to the multiplexer 50 as shown in FIG. 5.

Figure 6:
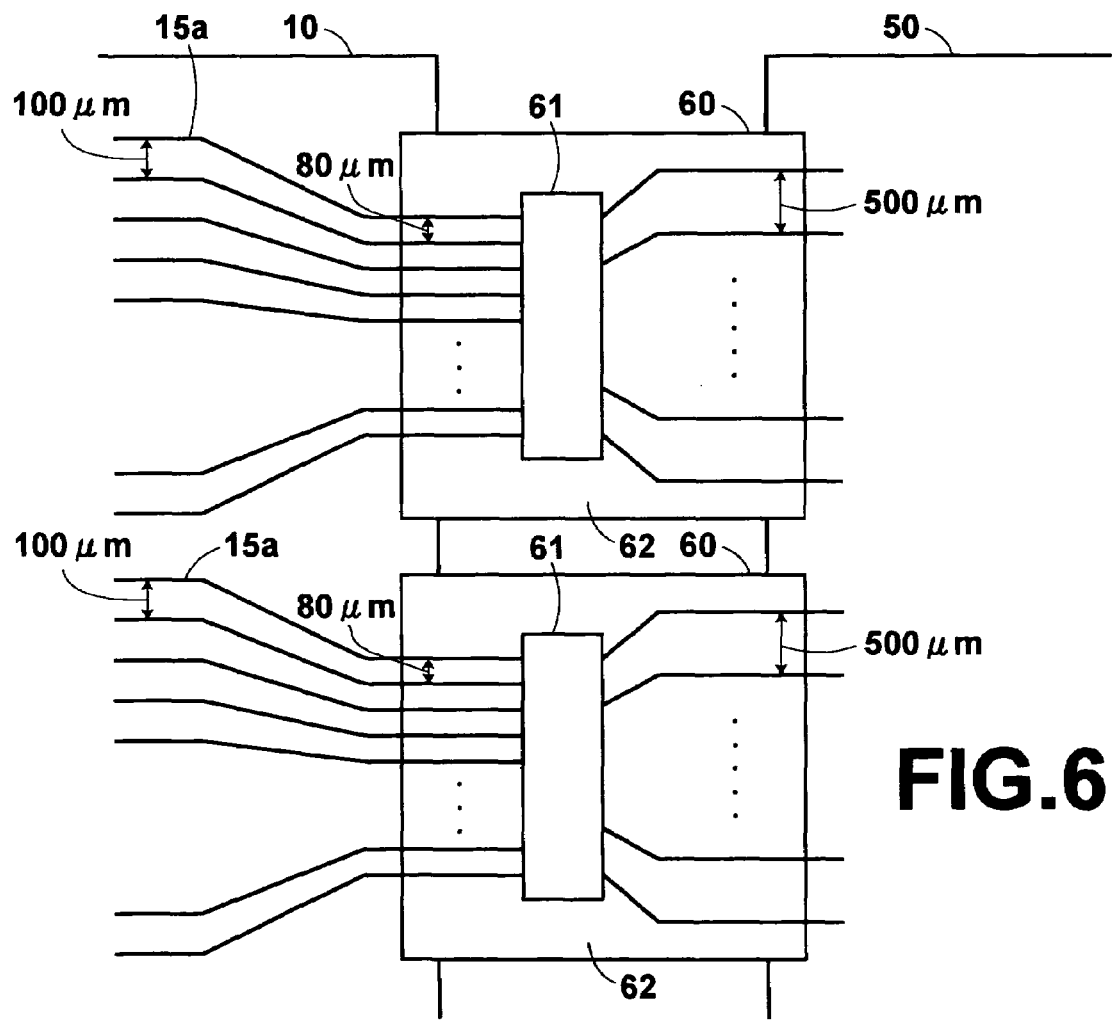
FIG. 6 is a view showing a form where the radiation image sensor is connected to the integrating amplifier ICs.
Figure 7:
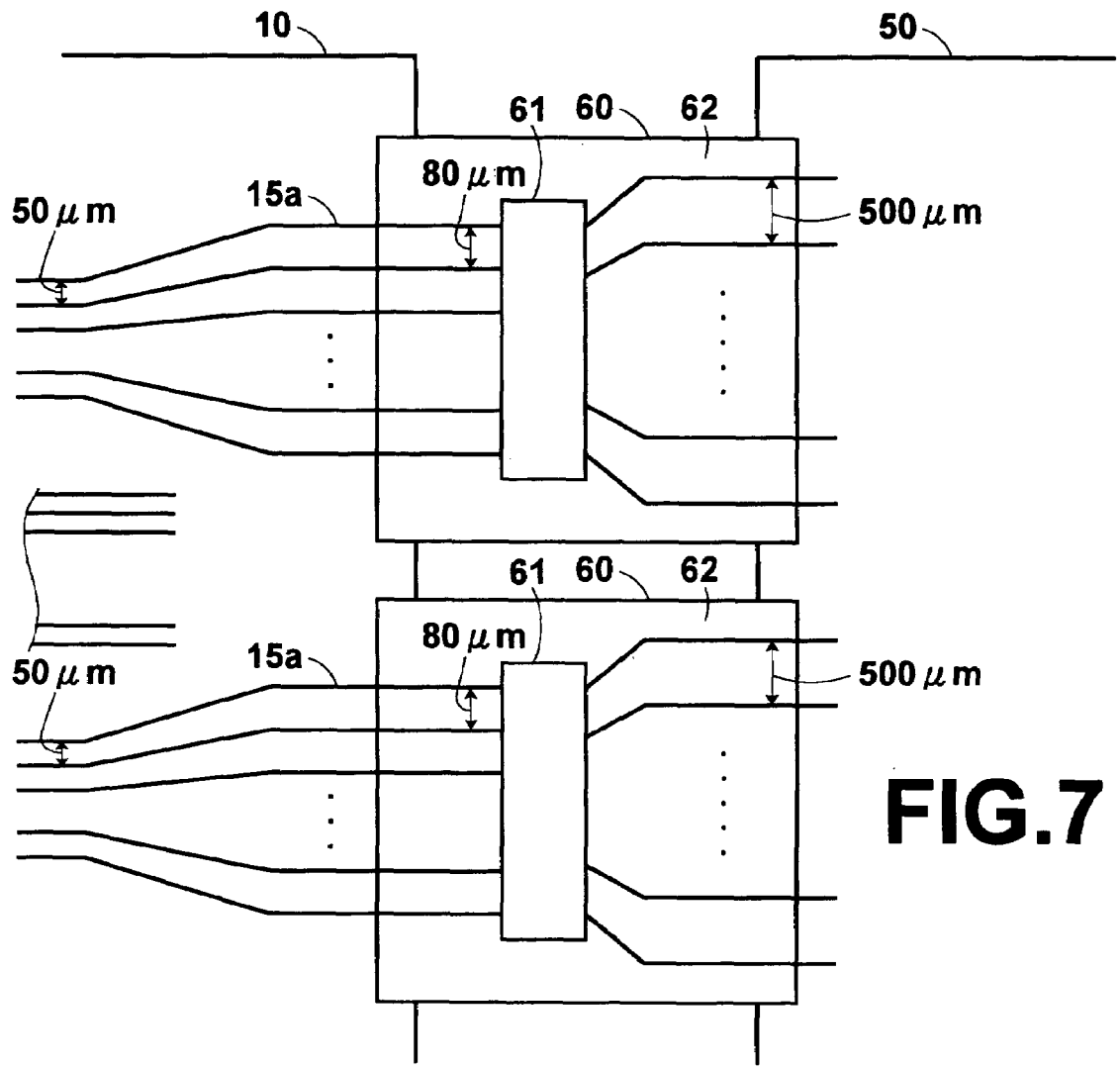
FIG. 7 is a view showing another form where the radiation image sensor is connected to the integrating amplifier ICs.

When the TABIC 60 shown in FIG. 5 is employed, it is preferred that, for instance, the input lines to the TABIC 60 be wired at pitches of 80 μm and the output lines therefrom be wired at pitches of 500 μm to be matched with the downstream circuits as shown in FIG. 6. By wiring the TABIC 60 in the manner described above, for instance, when the TABIC 60 is disposed in a radiation image sensor 10 for recording a chest radiation image, the linear electrodes 15*a* provided in the radiation image sensor 10 at pitches of 100 μm may be connected to the TABIC 60 by converging the front end portions thereof as shown in FIG. 6, and when the TABIC 60 is disposed in a radiation image sensor 10 for recording a chest radiation image (mammography), the linear electrodes 15*a* provided in the radiation image sensor 10 at pitches of 50 μm may be connected to the TABIC 60 by diverging the front end portions as shown in FIG. 7, whereby the TABIC 60 can be employed in common in a radiation image sensor 10 for a chest radiation image and a radiation image sensor 10 for a the mammography and the part cost can be reduced.

Figure 8:
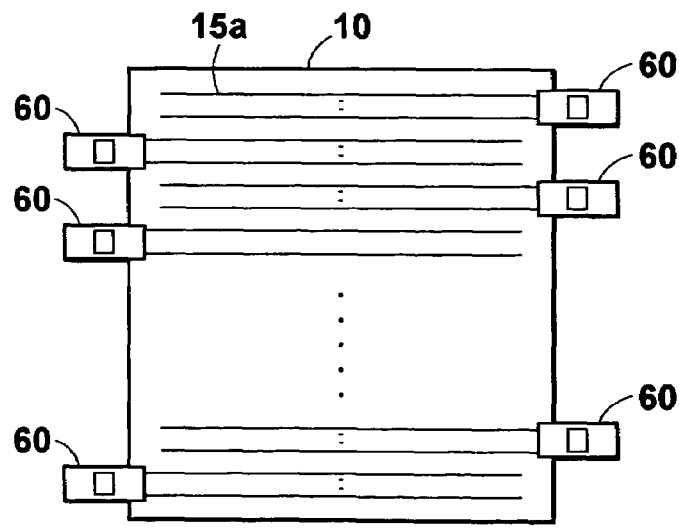
FIG. 8 is a view showing still another form where the radiation image sensor is connected to the integrating amplifier ICs.
Figure 9:
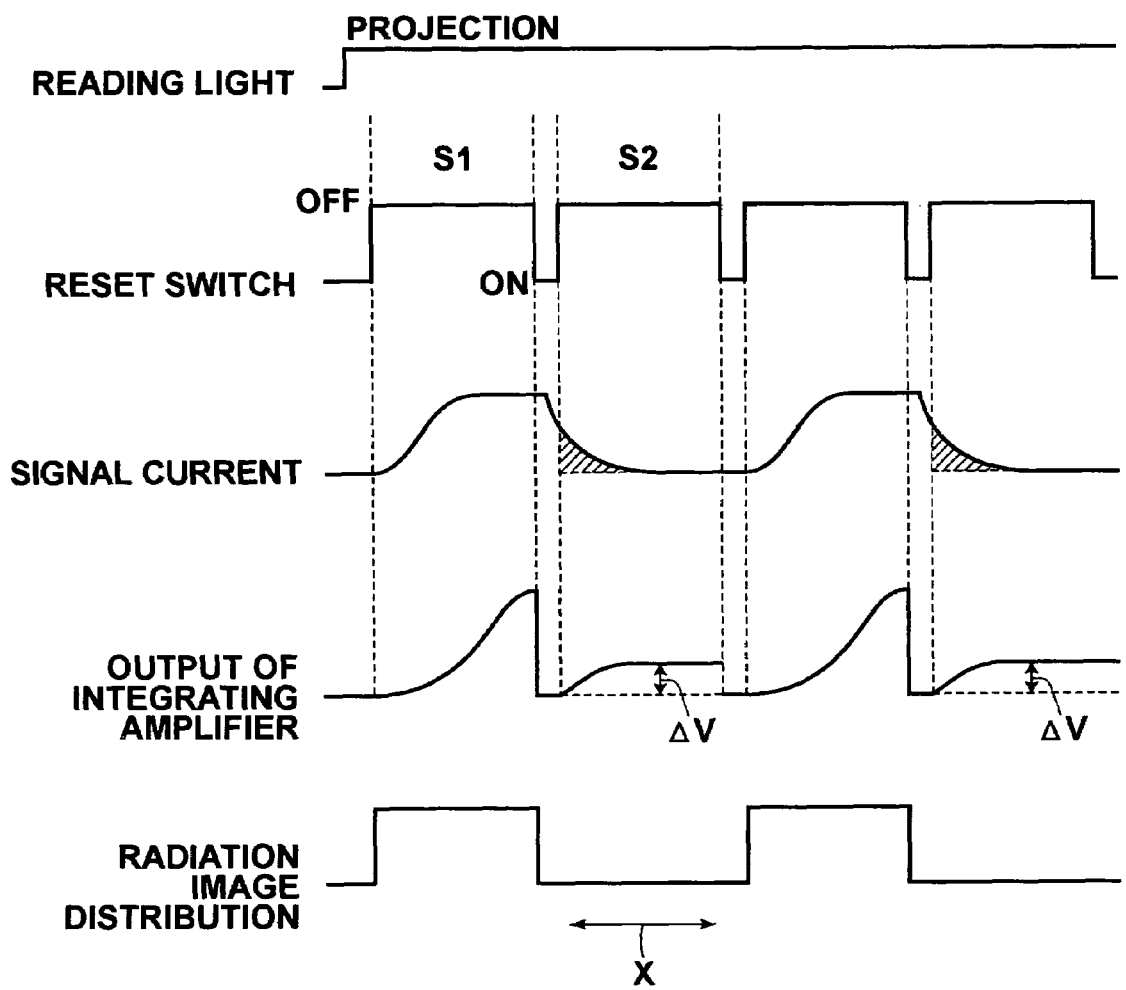
FIG. 9 is a view showing a timing chart representing the relation between the reading light beam projecting time and the integrating time of the integrating amplifiers when the radiation image is read out as well as the amplitude of the signal current output from the linear electrodes of the radiation image sensor and the amplitude of the output voltage of the integrating amplifiers upon exposure to the reading light beam, in the prior art.

When the TABIC 60 is disposed in a radiation image sensor 10 for the mammography, it is difficult to dispose the TABICs 60, to which all the linear electrodes 15*a* are connected, on one side of the radiation image sensor 10 because of the narrow spaces between the linear electrodes 15*a*. Accordingly, the TABICs 60 may be disposed alternately on opposite sides of the radiation image sensor 10 as shown in FIGS. 7 and 8. By disposing the TABICs 60 in the manner described above, all the linear electrodes 15*a* can be connected to the TABICs 60 even if the linear electrodes 15*a* are provided at pitches smaller than those of the input lines to the TABICs 60.

What is claimed is:

1. A method of reading out a radiation image comprising the steps of
   causing a linear reading light beam to scan a radiation image sensor, on which a radiation image is recorded upon exposure to radiation bearing thereon the radiation image and which has a plurality of parallel linear electrodes to output charge signals according to the radiation image when longitudinally scanned by a linear reading light beam extending in a direction perpendicular to the longitudinal direction of the linear electrodes, in the longitudinal direction of its linear electrodes, and obtaining an image signal by integrating charge signals, output by the respective linear electrodes in response to the scan of the reading light beam, for each integrating time, wherein the improvement comprises that
   a pulsed light beam which is projected by a pulsed light source onto the radiation image sensor for a predetermined time in each of the integrating times is employed as the reading light beam, and
   projection of the pulsed light beam is controlled by a light emission control means so that the center of the time for which the pulsed light beam is projected onto the radiation image sensor is earlier than the center of the integrating time;
   wherein the light emission control means controls the emission initiating time of the pulsed light beam by the pulsed light source so that there is a non-lighting time, for which the reading light beam is not lit, before the pulsed light beam is projected onto the radiation image sensor in the integrating time.

2. A method of reading out a radiation image according to claim 1, wherein the projection of said pulsed light beam is stopped before each integrating time is reset.

3. A method of reading out a radiation image according to claim 1, wherein said integrating time comprises a time at which a reset of the integrating time is performed.

4. An apparatus for reading out a radiation image comprising
   a reading light source portion which causes a linear reading light beam to scan a radiation image sensor, on which a radiation image is recorded upon exposure to radiation bearing thereon the radiation image and which has a plurality of parallel linear electrodes to output charge signals according to the radiation image when longitudinally scanned by a linear reading light beam extending in a direction perpendicular to the longitudinal direction of the linear electrodes, in the longitudinal direction of its linear electrodes, and an image signal detecting portion having a plurality of integrating amplifiers which obtain an image signal by integrating charge signals, output by the respective linear electrodes in response to the scan of the reading light beam, for each integrating time and outputs the integrated image signal, wherein the improvement comprises that
   the reading light source comprises
   a pulsed light source which emits a pulsed light beam projected onto the radiation image sensor for a predetermined time in each of the integrating times as the reading light beam, and
   a light emission control means which controls projection of the pulsed light beam by the pulsed light source so that the center of the time for which the pulsed light beam is projected onto the radiation image sensor is earlier than the center of the integrating time;
   wherein the light emission control means controls the emission initiating time of the pulsed light beam by the pulsed light source so that there is a non-lighting time, for which the reading light beam is not lit, before the pulsed light beam is projected onto the radiation image sensor in the integrating time.

5. The apparatus according to claim 4, wherein said integrating time comprises a time at which a reset of at least one of the integrating amplifiers is performed wherein the at least one integrating amplifier is turned on and then turned off.

* * * * *